J. W. EARNHARDT.
PNEUMATIC TIRE.
APPLICATION FILED SEPT. 23, 1907.
920,289.
Patented May 4, 1909.
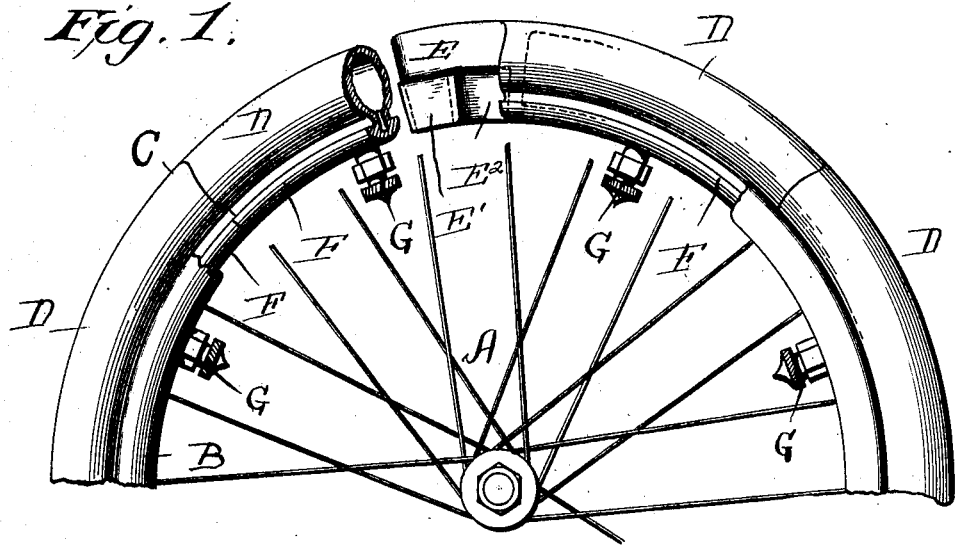
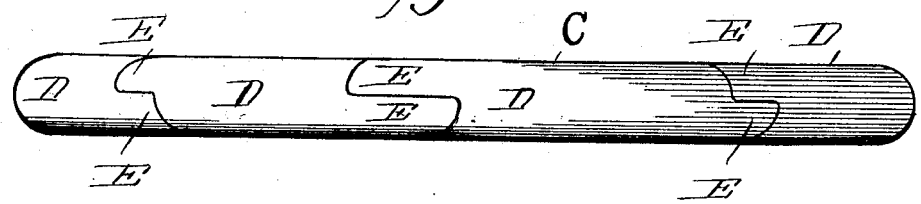
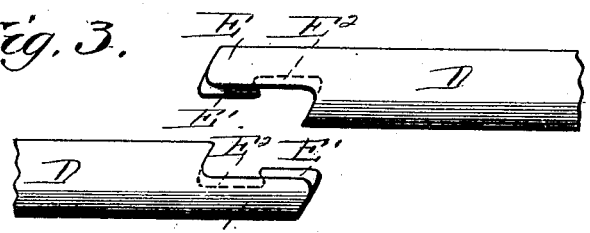
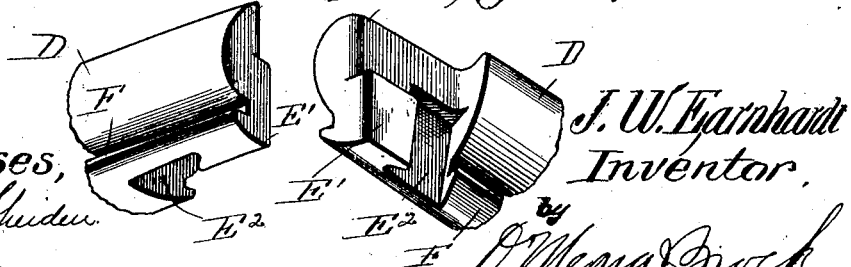
J. W. Earnhardt,
Inventor.
Witnesses,

UNITED STATES PATENT OFFICE.

JAMES WOOD EARNHARDT, OF LOS ANGELES, CALIFORNIA.

PNEUMATIC TIRE.

No. 920,289.   Specification of Letters Patent.   Patented May 4, 1909.

Application filed September 23, 1907.  Serial No. 394,138.

*To all whom it may concern:*

Be it known that I, JAMES W. EARNHARDT, a citizen of the United States, residing at Los Angeles, in the county of Los Angeles and State of California, have invented a new and useful Improvement in Pneumatic Tires, of which the following is a specification.

This invention relates to a pneumatic tire and more particularly to sectional pneumatic tires, the object being to provide a tire formed of a plurality of sections, each having a valve for inflating the same, so that when one section becomes punctured, it can readily be replaced by a new one.

Another object of my invention is to provide the sections with interlocking tongues, so that when in place and inflated, they will be securely held on the rim without any danger of coming off.

Another object of my invention is to provide each section with a valve-stem having a nut working thereon adapted to engage the rim for forming an additional lock for the sections.

Still another object of my invention is to provide the sections with a rib of hard rubber adapted to be locked in the rims of the wheels, the interlocking tongues being also formed of hard rubber, so that when united and the sections inflated, they will be securely locked on the rim.

With these objects in view, the invention consists in the novel features of construction, combination and arrangement of parts, hereinafter fully described and pointed out in the claims.

In the drawing forming a part of this specification:—Figure 1 is a side elevational view of a portion of a wheel showing my improved tire arranged thereon, the tire being broken away so as to show the locking tongue. Fig. 2 is a top plan view of my improved tire. Fig. 3 is a plan view of a portion of a pair of sections separated. Fig. 4 is a detail perspective view of the ends of the pair of sections showing the interlocking tongue.

Referring to the drawing A indicates a wheel provided with a rim B in which my improved tire C is adapted to be placed. The tire is formed of a plurality of sections D each section being cut away at its ends, upon opposite sides forming locking tongues E which are provided with shoulders E' and sockets E² adapted to interlock with each other when a number of these sections are placed on a rim. The tongues being formed of harder rubber than the body so as to prevent the same from giving, and each of the sections are formed with a rib F upon their underside, having grooves formed in its opposite sides, in which the shoulders of the rim are adapted to fit when forced into the same.

Each of the sections are provided with a valve-stem G which extends out through the rim and is provided with a nut working on the threaded exterior of the same which is adapted to be screwed against the rim, forming a lock for the sections. The body-portion of the sections are formed of very flexible rubber so that when the air has been removed from the same, the sections can readily be interlocked together, and that when inflated the pressure will hold the sections interlocked. When one of these sections becomes punctured, the valve-stem is removed and the sections can be readily detached and replaced by a duplicate section which can be easily carried in a very small space.

Having thus fully described my invention, what I claim as new and desire to secure by Letters Patent is:—

1. A pneumatic tire composed of a plurality of sections having integral interlocking tongues formed upon opposite sides of the respective sections.

2. A pneumatic tire composed of a plurality of pneumatic sections having interlocking tongues formed of hard rubber each tongue being provided with a shoulder and a socket.

3. A pneumatic tire formed of a plurality of sections each section being provided with a tongue at its ends, upon opposite sides, each tongue being provided with a shoulder and a socket adapted to interlock with the tongue of the adjacent section.

4. A pneumatic tire comprising a plurality of sections formed of flexible rubber having a rib on their under sides, each section being provided with an inflating valve, said sections being interlocked together at their ends by tongues formed upon opposite sides of the respective sections for the purpose set forth.

5. A pneumatic tire comprising a plurality of detachable flexible sections, each section having a rib of hard rubber formed on its under side, carrying a valve-stem, and locking tongues formed on the ends of said section and rib, upon opposite sides, said tongues being formed of hard rubber and provided with a shoulder and a socket for interlocking with the tongue of the adjacent section, for the purpose set forth.

6. A pneumatic tire comprising a plurality of sections having solid ends and hollow intermediate portions, the ends of each section being provided with oppositely disposed tongues, said tongues being cut away to form a socket and a shoulder adapted to interlock with the tongue of the adjacent section whereby said sections will be securely held together when placed on a wheel.

JAS. WOOD EARNHARDT.

Witnesses:
F. J. CHAMBERLAIN,
WM. A. BURNS.